United States Patent

[11] 3,604,695

[72] Inventor Donald E. Steeper
Rexford, N.Y.
[21] Appl. No. 884,887
[22] Filed Dec. 15, 1969
[45] Patented Sept. 14, 1971
[73] Assignee General Electric Company

[54] METHOD AND APPARATUS FOR CONTROLLING A SLAB REHEAT FURNACE
23 Claims, 11 Drawing Figs.
[52] U.S. Cl. .................................................. 266/5 T,
266/5 F
[51] Int. Cl. ...................................................... F27b 9/40
[50] Field of Search ........................................... 266/2 R, 5
R, 5 F, 5 T

[56] References Cited
UNITED STATES PATENTS
2,275,265  3/1942  Mead .......................... 266/5 T 3,179,395  4/1965  Esler .......................... 266/5 F Primary Examiner—Gerald A. Dost
Attorneys—John B. Sponsler, Gerald R. Woods, Frank L. Neuhauser, Oscar B. Waddell, Melvin M. Goldenberg and Arnold E. Renner ABSTRACT: In controlling a slab reheat furnace, the average temperature of each slab in a zone is predicted as a function of the ambient temperature, thermal properties, dimensions, location, velocity and past thermal history of the slab. The deviations between the predicted average temperatures and predetermined desired average temperatures are weighted as a function of location before being summed to establish a performance index. Proportional plus integral control techniques are used to determine what change in a zone temperature set point will drive the performance index to zero.

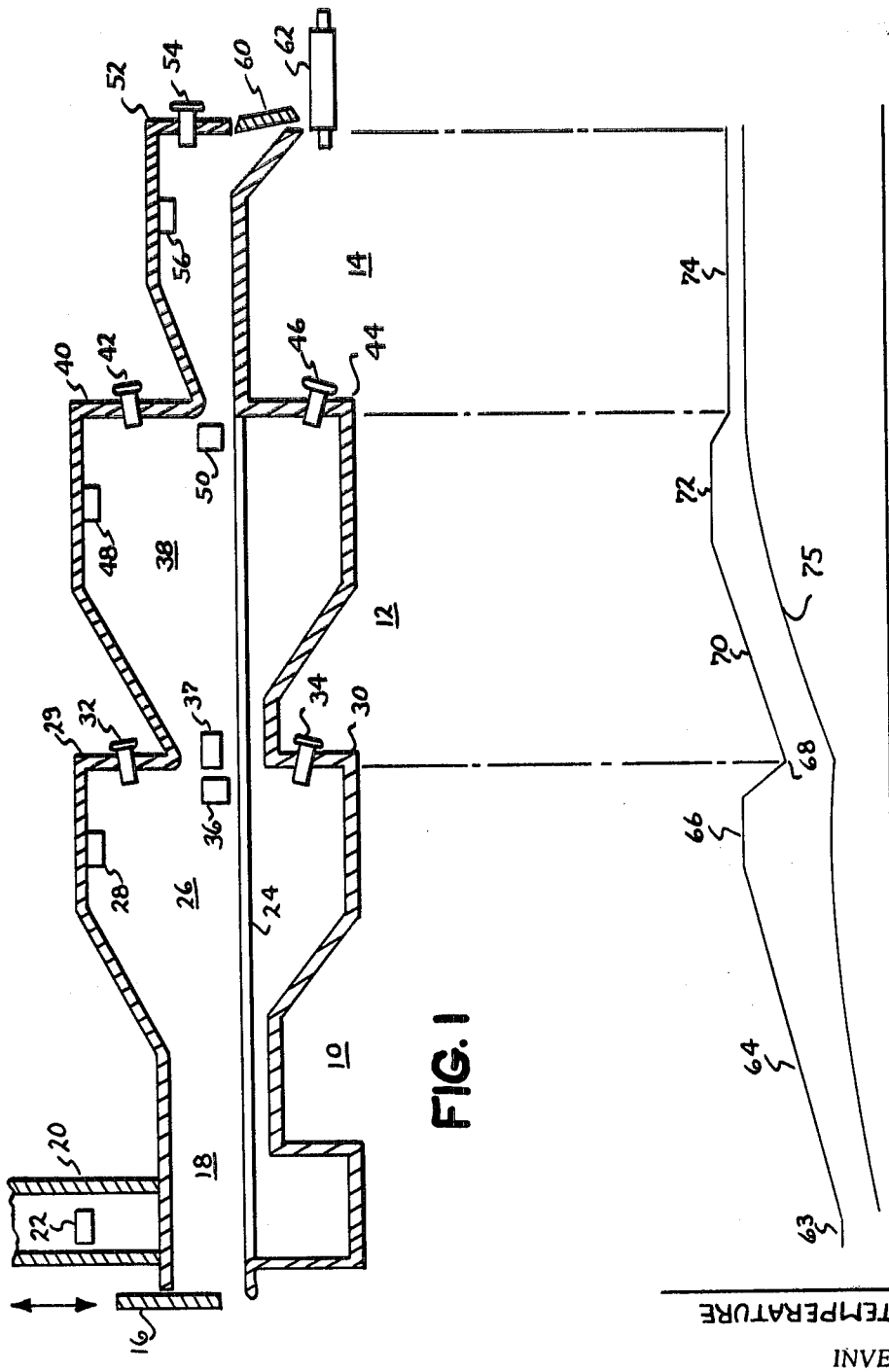

METHOD AND APPARATUS FOR CONTROLLING A SLAB REHEAT FURNACE

BACKGROUND OF THE INVENTION

The present invention relates to the control of furnaces and more particularly to the control of the type of furnaces used to reheat slabs prior to processing in hot strip rolling mills.

In a widely used process for rolling semifinished metal products in hot strip mills, metal slabs are stored at ambient temperatures in storage areas referred to as slab yards until needed at the mill. Since a stored slab naturally cools down during storage, it must be reheated before further processing in the rolling mill. Typically, a slab reheat furnace includes three successive major zones: a preheat zone, a heat or tonnage zone, and a soak zone. Such a furnace essentially operates as a counterflow heat exchanger in which a fuel such as gas or oil is burned in each zone. A slab reheat furnace generally operates continuously with unheated slabs entering or being charged into the preheat zone as fully reheated slabs are discharged from the soak zone and as slabs in intermediate stages of being reheated are pushed toward the discharge end of the soak zone by entering slabs in a pusher-type furnace or are walked toward the discharge end by movable supports in a walking beam-type furnace. The exhaust gasses which are generated flow counter to the direction of slab movement. That is, soak zone gasses flow into the heat zone and, together with heat zone gasses, on into the preheat zone. Exhaust gasses in the preheat zone normally pass into an air/air recuperator before flowing to a furnace exhaust stack.

The primary function of any slab reheat furnace control system is to cause every slab charged into the furnace to be reheated to a particular temperature deemed to be appropriate for the particular slab material and the type of rolling to follow. This function is not easily performed for several reasons. First, the output of burners in a particular zone influences the temperatures of all slabs within the zone and, to some extent, the temperatures of slabs in preceding zones into which the exhaust gas flows. Second, the slabs within a zone may not be the same size and may require different thermal inputs to be reheated to the same temperature at the time each is discharged from the furnace. Third, mill delays which can be planned or unplanned may result in some slabs in a group being held within a furnace for indeterminate longer periods of times than others.

Several systems have been implemented in attempts to perform the function of heating every slab to the same desired temperature. These systems are, however, usually based on assumptions which are not universally regarded to be valid ones. For instance, one known system assumes that the temperature within the zone is a constant one and that each slab moving through a zone may be regarded as having average dimensions regardless of its actual dimensions. Other systems rely entirely on measurements of slab surface temperatures in order to regulate the operation of the furnaces. Presently available slab temperature sensors are not universally regarded as having the capability of reading slab temperatures with a high degree of accuracy and reliability needed to control the furnace under all operating conditions.

SUMMARY OF THE INVENTION

The present invention includes a method and an apparatus for controlling a heating means in a slab reheat furnace zone so as to heat each slab leaving the zone to a predetermined temperature. The average temperature of each slab in the zone is predicted as a function of the gas temperatures in the zone, the thermal properties of the slab, the dimensions of the slab, the location of the slab within the zone, the rate of movement of the slab and the thermal history of the slab. This predicted average temperature is then compared with a desired temperature at the same location based on a predetermined desired slab temperature trajectory. A performance index is established as a function of the combined comparisons for all slabs within the zone. The output of the heating means is adjusted in accordance with the magnitude of the established performance index.

DESCRIPTION OF THE DRAWINGS

While the specification concludes with claims particularly pointing out and distinctly claiming that which is regarded as the present invention, details of preferred embodiments of the invention may be more readily ascertained from the following detailed description when read with reference to the accompanying drawings in which:

FIG. 1 is a simplified elevation of a slab reheat furnace showing the location of the burners and temperature sensors;

FIG. 2 is a typical profile of gas temperatures and desired slab temperatures throughout the length of the furnace;

DETAILED DESCRIPTION

Figure 3:
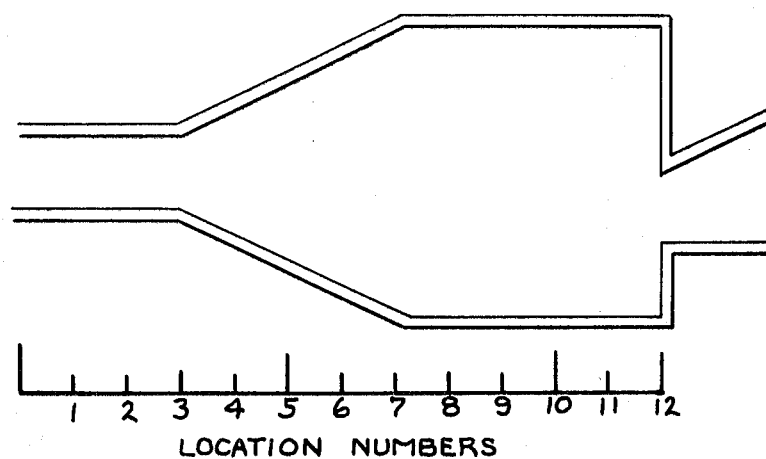
FIG. 3 is a simplified elevation of one zone in a furnace including a scale for identifying slab locations in the zone.

Referring now to FIG. 1, a reheat furnace of the type which could be controlled by the present invention includes a preheat zone 10, a heat or tonnage zone 12, and a soak zone 14. Slabs taken from a slab storage yard are charged into the reheat furnace one at a time through a charging door 16 leading to a throat 18 to the preheat zone 10. An exhaust stack 20 coupled to the throat 18 passes exhaust gasses from the slab reheat furnace into an air/air recuperator. A thermocouple 22 monitors the temperature of the exhaust gasses. If the temperature exceeds a certain maximum, cooling sprays (not shown) in the exhaust stack 20 may be used to reduce the gas temperature. The location of the exhaust gas thermocouple 22 is not critical except that it must be located ahead of the cooling sprays and recuperator within the exhaust stack 20.

Slabs entering the furnace through door 16 move along a skid 24 into the preheat chamber 26 which includes an upper firing wall 29 and a lower firing wall 30 containing burners 32 and 34, respectively. While the burners 32 and 34 are represented by a single element, there is normally a row of such elements extending across the width of the furnace for maintaining a uniform temperature gradient from one side of the furnace to the other. The gas temperature in the preheat chamber 26 is monitored by a preheat thermocouple 28 mounted in a suitable location in the chamber. The temperature of a slab leaving the preheat chamber 26 is monitored by a radiation pyrometer 36 located near an entry knuckle to a heat chamber 38 in the heat zone 12 while the gas temperature at the knuckle is sensed by a thermocouple 37.

Although heat zone 12 may be somewhat shorter than preheat zone 10, it is similar in structure in that it includes an upper firing wall 40 having a row of burners represented by burner 42, a lower firing wall 44 having a row of burners represented by burner 46, a suitably located thermocouple 48, and a slab pyrometer 50 located at the exit from the heat zone 12. Slabs pass from the heat zone 12 into the soak zone 14 which is used primarily to equalize temperatures within the slab. Soak zone 14 has a single firing wall 52 with a single row of burners represented by burner 54 located above the passline for the slabs. A thermocouple 56 monitors the gas temperatures within the soak zone 14. Fully reheated slabs are discharged from the furnace on a ramp 58 leading to a hinged discharge door 60. The slabs are directed onto roller tables, represented by roller 62, which transport them to scale-breaking rolls in the rolling mill.

When slabs are being reheated, the outputs of the burners are regulated to establish a gas temperature profile of the type shown in FIG. 2. The gas temperature in the preheat zone increases along an approximately linear curve 64 from a minimum temperature 63 at the entrance to the zone to a plateau 66 within the chamber 26 before falling to a minimum 68 at the entry knuckle to the heat zone 12. From the minimum 68 at the entry knuckle, the gas temperature rises along an approximately linear curve 70 to a second plateau 72 in the chamber 38 for the heat zone 12. Because the soak zone 14 is intended primarily for equalizing temperatures, the temperatures within that zone are preferably uniform from the entry knuckle to the discharge door 60. In the gas temperature profile the soak zone temperature appears as a horizontal line 74.

Although the furnace always contains groups of slabs, a degree of control over the reheating of individual slabs is attained by adjusting the slopes and magnitudes of the gas temperature profile in the furnace in accordance with sensed and predicted temperatures of each of the slabs in the zone. The average temperature of each slab in a zone is predicted as a function of the thermal characteristics of the slab, the gas temperatures in the zone, the dimensions of the slab, the location of the slab within the zone, the velocity of the slab and the thermal history of the slab. The deviation between the calculated average temperature for each slab and a desired temperature according to a predetermined slab temperature trajectory 75 shown in FIG. 2 is weighted according to the location of the slab within the zone. The sum of the weighted deviations provides a performance index which can be driven to zero by successively incrementing the zone temperature set points in a proportional plus integral control.

The temperature set points in the preheat zone 10 and the heat zone 12 are controlled by independent but essentially identical systems. To avoid repetition, only one system is disclosed and described.

Predicting the average temperature of each slab in a group of slabs involves identification of the location of each slab within the zone. Referring to FIG. 3, each zone is divided into I number of locations where I is determined by dividing the average slab width into the length of the zone. To illustrate, assume that the zone is 48 feet long and that the average slab width is 4 feet. Given these figures, the number of locations in the zone is calculated as 48/4 or 12. Normal reheating practice in either a pusher-type furnace or a walking beam-type furnace is to have each zone completely loaded with slabs so that a slab would be centered on each of the locations identified in FIG. 3.

The surface and center temperatures of each slab within a zone are calculated by numerically integrating a suitable set of nonlinear, simultaneous, differential equations, such as:

(1)
$$\frac{dT_{si}}{dt} = \frac{2\epsilon_i \sigma}{C\rho h_i \delta}[(T_{gi}+460)^4 - (T_{si}+460)^4] - \frac{8K(T_{si}-T_{ci})}{C\rho h_i^2 \delta(1+\delta)}$$

(2)
$$\frac{dT_{ci}}{dt} = \frac{8K(T_{si}-T_{ci})}{C\rho h_i^2 (1-\delta^2)}$$

Where
$T_{si}$ = surface temperature of slab at location $i$ in °F.;
$T_{ci}$ = center temperature of slab at location $i$ in °F.;
$T_{gi}$ = gas temperature at location $i$ in °F.;

$\epsilon_i$ = emissivity at location $i$;
$\sigma$ = Stefan—Boltzman constant ($0.172 \times 10^{18}$ B.t.u./hr.-ft.$^2$ - °R$^4$);
$C$ = slab heat capacity in B.t.u./lb.-°F.;
$\rho$ = slab density in lbs./ft.$^3$;
$h_i$ = thickness of slab at location $i$ in feet;
$\delta$ = ratio of surface slice thickness to ½ total slab thickness; and
$K$ = slab heat conductivity in B.t.u. - ft/ft$^2$ - hr - °F.

The integration time interval for the first equation should be 0.1–0.2 of that used for the second equation to minimize the chances of error due to the frequent small time constants in the first equation. The length and width of the slabs are assumed to be constants with only the thickness $h_i$ being considered a variable.

Figure 4:
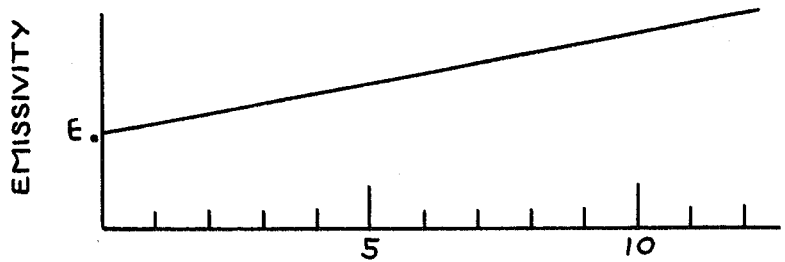
FIG. 4 is a profile of emissivity factors assumed to exist at the slab locations identified in FIG. 3.

While several of the terms of the first and second equations are independent of the location of a slab within a zone, others such as gas temperature and emissivity may be functions of the location of a slab within a zone. Referring to FIG. 4, the emissivity at a location $i$ ($\epsilon_i$) may be determined from the following equation for the curve in that figure. (3)  $\epsilon_i = \epsilon_0 + mL$ where $\epsilon_0$ is the emissivity at the entry or zero location of the zone, $L$ is the location number of the slab, and $m$ is the slope of the linear curve in emissivity units per location units. The initial values for $\epsilon_0$ and for $m$ may be obtained from theoretical considerations and/or observations. As will be explained later, these values may be changed or updated by data obtained during actual furnace operation.

Figure 5:
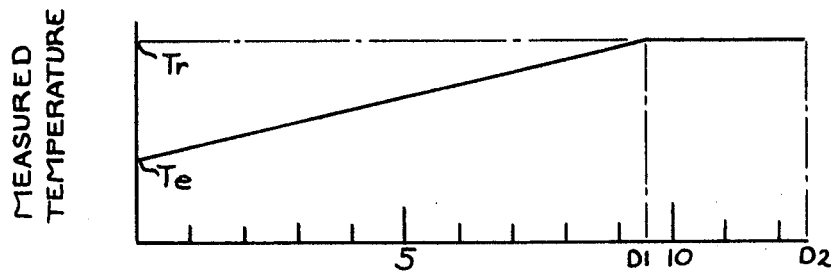
FIG. 5 is an example of a gas temperature profile established by measuring temperatures at spaced points in the zone shown in FIG. 3.

The gas temperature profile of a zone is established by measuring the temperature at the entry to the zone ($T_e$) and the temperature at the roof of the zone chamber ($T_r$), and by inserting the measured values into a profile equation. Referring to FIG. 5, the gas temperature $T_{gi}$ at a particular location $i$ may be expressed as (4)
$$T_{gi} = \begin{cases} T_e + \left(\frac{T_r - T_e}{D_1}\right)L & 0 < L < D_1 \\ T_r & D_1 < L < D_2 \end{cases}$$

where $D_1$ is a breakpoint in the profile occurring at a point $D_1$ location units from the zone entry and $D_2$ is the number of location units by which the zone exit is separated from the zone entry. The value of $D_1$ may be obtained empirically or by consideration of the heat transfer characteristics of the zone.

Figure 6:
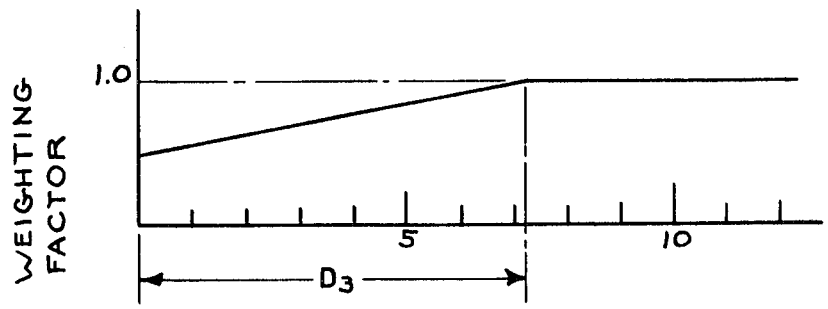
FIG. 6 is a profile of weighting factors to be assigned to slab temperature deviations found to exist at locations identified in FIG. 3.

Equations (1) and (2) are based on an assumption that the temperature distribution in the thickness dimension of a slab heated uniformly from above and below is parabolic. Therefore, the average temperature $T_{ai}$ of a slab having a center temperature $T_{ci}$ and equal surface temperatures $T_{si}$ would be:
(5)  $T_{ai} = (\frac{1}{3})(T_{si} + 2T_{ci})$ In executing a method embodying the present invention, the surface, center and average temperatures of each slab in a zone are calculated from equations (1) and (2) after determining the gas temperature $T_{gi}$ from equation (4), the emissivity $\epsilon_i$ from equation (3), and the thickness $h_i$ of the slab from previous measurements. The average temperature $T_{ai}$ of each slab is compared with a desired temperature $T_{di}$ of a slab in that location as taken from a predetermined slab temperature trajectory of the type shown in FIG. 2 to determine the deviation ($T_{ai} - T_{di}$) between the two. Since a change in a zone temperature set-point effects the temperature of every slab in the zone, the deviations must be combined to determine what change in temperature set-point will yield the best overall improvement. The deviations of slabs near the exit from the zone are naturally more critical than the deviations of slabs still near the entry to the zone. To reflect this criticality, a weighting factor $W_i$ is assigned to each deviation as a function of the location of the slab within the zone. Referring to FIG. 6, the weighting factor $W_i$ increases linearly from a minimum at the zone entry to a maximum of 1.0 at a distance $D_3$ from the zone entry. The weighing factor remains constant at 1.0 for all locations between distance $D_3$ and the zone exit.

The weighted temperature deviations are summed to establish a zone performance index:

$$J=\sum_{i=1}^{I} W_i (T_{si}-T_{di}) \quad (6)$$

Using conventional proportional plus integral control techniques, the value of the performance index is driven to zero to establish the increment in temperature set-point which will minimize temperature deviations of slabs throughout the zone.

The thermal history of a slab is taken into account in the initial conditions used during the integration of equations (1) and (2). When a slab first enters the slab reheat furnace, its surface and center are at the easily measured ambient temperature in the vicinity of the slab yard. This ambient temperature is used as an initial condition in solving the differential equations to predict the surface and center temperatures to which the slab will be reheated while in the first location in the furnace. When the surface and center temperatures of the slab in the first location have been predicted, these temperatures may be used both in establishing a first location temperature deviation and as initial conditions for the integration performed in the next prediction of the surface and center temperature of the same slab. If the mill is operating properly, the slab is normally shifted into the next or second location before the next prediction of surface and center temperatures takes place. If, however, there is a mill delay of either the planned or unplanned type, the slab may still be in the first location when the next temperature prediction occurs. The temperature prediction is still performed in the same manner and no special procedures or assumptions are needed to handle the mill delay.

The process of using the predicted slab temperatures in one location as the initial conditions for the prediction of temperatures of the same slab in the next location is repeated as the slab moves through successive locations. For this reason, any change in a zone temperature set point reflects not only the present thermal conditions in the zone but also the past thermal conditions regardless of whether those conditions existed during normal mill operation or during a mill delay.

As is well known, steel slabs being reheated require additional heat when at a critical temperature of approximately 1,350° F. before the slab temperature will continue to increase. According to the present invention, the surface and center temperatures are always predicted in the manner outlined above. When the surface temperature first reaches the critical temperature, equation (1) can be modified by setting $dT_{si}/dt=0$ until $$\int \left\{\frac{2\epsilon_i \beta}{\rho h_i \delta}[(T_{si}+460)^4-(T_{si}+460)^4]-\frac{8K(T_{si}-T_{ci})}{\rho h_i^2 \delta(1+\delta)}\right\}dt$$

equals or exceeds a predetermined heat input per pound. In one specific application of the invention, the heat input per pounds is set at 25 B.t.u./lb.

When the predicted center temperature $T_{ci}$ first becomes equal to or exceeds the critical temperature, equation (2) is similarly modified by setting $dT_{ci}/dt=0$ until $$\frac{5.33K}{\rho h_i^2(1-\delta^2)}\int (T_{si}-T_{ci})dt$$

equals or exceeds the predetermined heat input per pound. When the predicted surface temperature and the predicted center temperatures are greater than the critical temperature, equations (1) and (2) are reverted to in their unmodified form.

Figure 7:
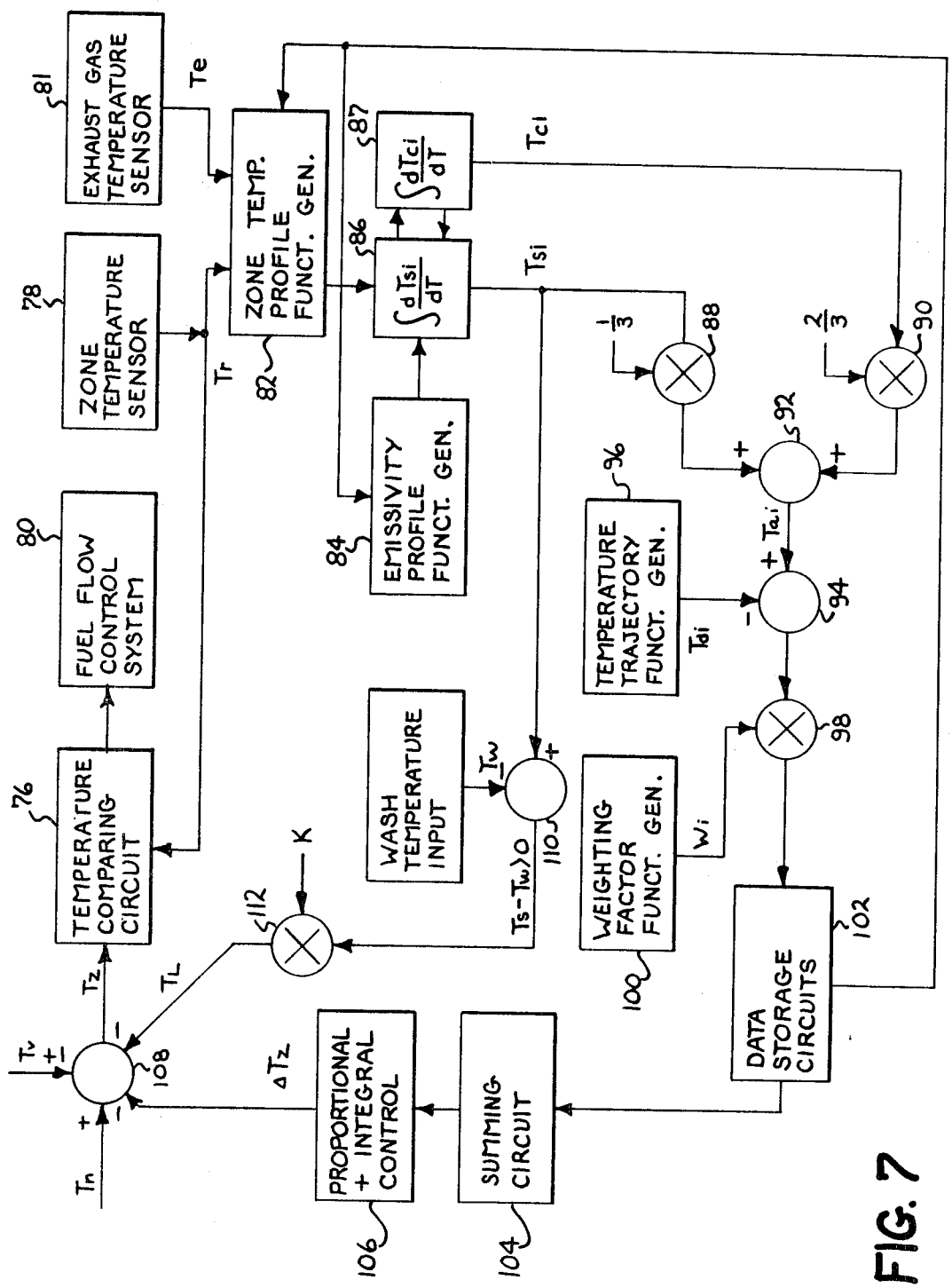
FIG. 7 is a functional block diagram of an apparatus incorporating the concepts of the present invention.

The method set out above may be practiced with analog or digital apparatus of the type described functionally with reference to FIG. 7. The function of the system is to determine the temperature set point $T_z$ which, when applied to a temperature-comparing circuit 76 along with an input from a zone gas temperature sensor 78, permits a fuel flow control system 80 to vary the zone gas temperature in a predetermined manner. The determination of the temperature set point signal $T_z$ is the end result of the process which is repeated at least each time the number or location of the slabs within a zone is changed. In a pusher-type furnace, the location of slabs change as each new slab charged into the furnace pushes previously charged slabs toward the discharge end of the furnace. In a system for the preheat zone, the apparatus includes a gas temperature sensor 78 and the exhaust gas temperature sensor 81 which supply temperature signals $T_r$ and $T_e$ respectively to a zone temperature profile function generator 82. Based on the measured temperatures, the zone temperature profile generator 82 first produces an output signal representing the zone gas temperature at the first slab location in the preheat zone. An emissivity profile function generator 84 similarly produces an output signal representing slab emissivity at the same location.

The output signals from function generators 82 and 84 are applied to a numerical integrator 86 which together with a second integrator 87 integrate equations (1) and (2) over suitable time intervals to predict the surface temperature $T_{si}$ and the center temperature $T_{ci}$ respectively of the slab in the first location. The signal representing the surface temperature $T_{si}$ is applied to a multiplier circuit 88 which forms a product representing ⅓ $T_{si}$ while the signal representing the center temperature $T_{ci}$ is applied to another multiplier circuit 90 which forms a product representing ⅔ $T_{ci}$. The summation of these products in an adder circuit 92 yields the predicted average temperature $T_{al}$ of the slab in the first location to the zone. The deviation of the predicted average temperature $T_{al}$ of this slab from the desired slab temperature $T_{dl}$ at the first location is established by applying the output of the adder circuit 92 to a second adder circuit 94 having a second negative input from a temperature trajectory function generator 96. The signal on the output of the adder circuit 94 is the unweighted deviation for the first location and is applied to a multiplier circuit 98 having another input from a weighting factor function generator 100. The product of the weighting factor $W_1$ and the deviation $T_{al}-T_{dl}$ for the first location is stored in a data storage circuit in a group of circuits 102.

The apparatus performs iteratively through a closed loop from the data storage circuits 102 to the zone temperature profile function generator 82 and the emissivity profile function generator 84. The zone temperature at the second slab location and the emissivity at the second slab location are applied to the numerical integrators 86 and 87 which determine the surface and center temperatures for the slab at the second location. The average temperature, unweighted deviation, and weighted deviation are predicted for the slab at the second location in the same manner as they were for the slab in the first location. The weighted deviation is stored in a second circuit in a group of data storage circuits 102. The calculations are repeated for slabs in succeeding location in the zone until the weighted deviations for all slabs in the zone have been calculated and stored. The weighted deviations stored in the circuits 102 are added in a summing circuit 104 to determine a total deviation for the zone. This total deviation is applied to a proportional plus integral control 106 to determine the increment $\Delta T_z$ in the zone temperature set point which drives the total deviation to zero. The output $\Delta T_z$ of the proportional plus integral control system is applied to a summing junction 108 having other inputs representing the nominal temperature $T_n$ about which the zone is to be operated, a vernier or bias temperature $T_v$ which may be set by the furnace operator to reflect any observed long term changes, and a limit temperature $T_L$.

Figure 8:
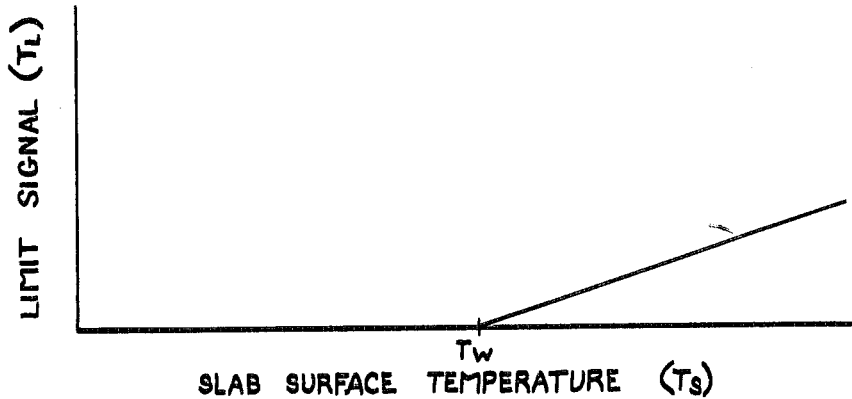
FIG. 8 is a profile of a slab temperature limit signal generated in one part of the apparatus of FIG. 7 to prevent overheating and consequent melting of slab surfaces.

The function of the limit temperature signal is to assure that the zone temperature set point $T_z$ does not exceed a temperature at which the surface of the slabs within the zone would be washed or would melt. $T_L$ is a function of the deviation between the surface temperature for a slab and a predetermined wash temperature $T_w$. $T_L$ is zero where the surface temperatures of all slabs in a zone are less than the wash temperature and is proportional to the difference between the surface and the wash temperatures for any slab having a predicted surface temperature exceeding the wash temperature. A graph of this function appears in FIG. 8. It will be seen that $T_L$ is zero for all slab surface temperatures below a wash temperature and is a linear function having a slope of K for all slab surface temperatures exceeding a wash temperature $T_w$.

In the apparatus shown in FIG. 7, the signal $T_{sl}$ representing the predicted slab surface temperature is applied to an adder circuit 110 having a second negative input representing the wash temperature $T_w$ for the particular composition of the slab in the furnace. Where the difference between the predicted slab surface temperature and the wash temperature is greater than zero, adder circuit 110 supplies a signal representing this difference to a multiplier circuit 112 having a second input representing the constant K. The output of the multiplier circuit 112 is the limit signal $T_L$ that is applied to the summing junction 108.

Figure 9:
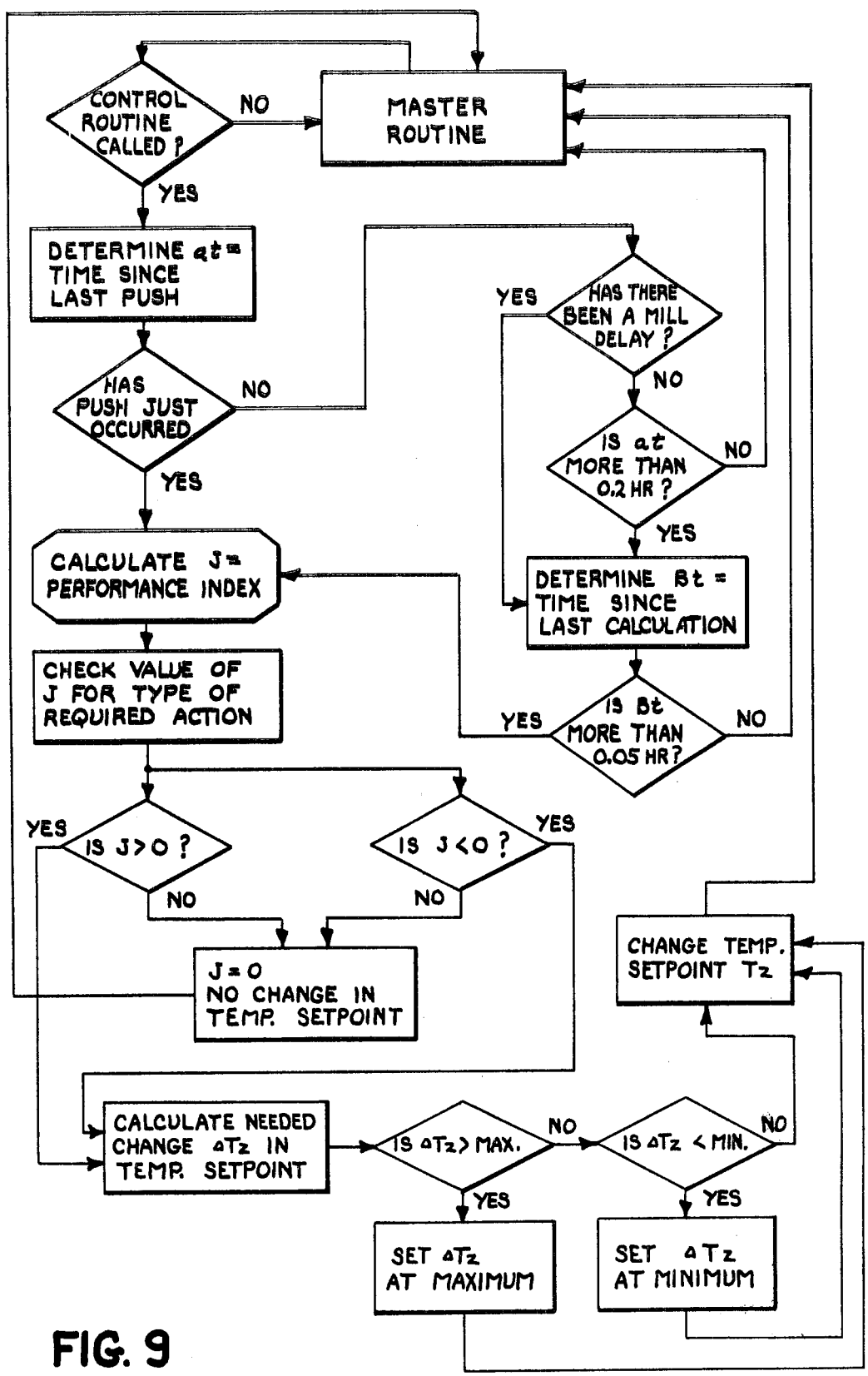
FIG. 9 is a diagram of a routine incorporating the present invention.

In controlling the operation of slab reheat furnaces, the most difficult situation likely to be encountered is an unplanned mill delay. Such a delay can result in some slabs being held in the furnace for a lengthy period of time while succeeding slabs which are charged into the furnace after the delay ends, remain in the furnace for a normal shorter period of time. To prevent overheating of one slab or underheating of the other under the conditions of a mill delay, a system implemented in accordance with the present invention responds during a mill delay in precisely the same way it responds during normal production except that the method obviously cannot be performed on a once a push basis as it preferably is during production. Performance of the method is initiated during production and during delays in accordance with the control routine shown in FIG. 9.

When the temperature set point control routine is called by a master routine, a determination is made as to the amount of time ($\alpha T$) since the last push occurred in the furnace. If a push has just occurred, the performance index J is calculated directly. If a push has not just occurred, an inquiry is made as to whether there has been a mill delay since the last temperature setpoint calculation. If not, an inquiry is made as to whether $\alpha T$ exceeds 0.2 hours or 12 minutes. If $\alpha T$ is not more than 12 minutes and if there has been no mill delay, the temperature set point control routine is not needed and control returns to the master routine. If $\alpha T$ exceeds 12 minutes even in the absence of a mill delay, the next step is to determine $\beta T$ or the time since the last calculation. Any time there has been a mill delay, $\beta T$ is determined regardless of the magnitude of $\alpha T$. If $\beta T$ exceeds 0.05 hours, the performance index J is also calculated as if a push had just occurred. If, however, $\beta T$ is less than 0.05 hours or 3 minutes, the temperature set point control routine is not needed and control passes back to the master routine.

Once J has been determined, its magnitude must be checked to determine the type of required action. If J is greater than zero or is less than zero, some change in the temperature set point is necessary. If J is neither greater than zero nor less than zero, it must be zero so that no change in the temperature set point is necessary. Under the latter conditions, control passes back to the master routine. When it is determined that a change in the temperature set point is needed, a determination must be made as to whether the required change is greater than a maximum change. If it is, the change is limited to the predetermined maximum change. If the calculated change is not greater than the maximum change, a determination is then made as to whether it is less than a predetermined minimum change which is established to prevent the gas temperature from being decreased too much during a mill delay so that slabs entering the preheat zone following the delay would be seriously underheated. If the calculated change is less than the minimum, the change to be made is set at the minimum. Once the temperature set point has been changed, there is no further need for the temperature set point control routine and control passes back to the master routine.

Where pyrometers in an installation produce satisfactorily accurate signals, adaptive feedback of one type may be used to modify the emissivity values to correct for errors in the constants and to compensate for long term changes in furnace-operating characteristics. As indicated earlier, the emissivity $\epsilon_i$ at a particular location would be equal to $\epsilon_o + mL$ where $\epsilon_o$ is the emissivity at the zone entry, $m$ is the slope of the emissivity function, and L is the distance between the particular location and the zone entry. An adaptive feedback results in the addition of a $\Delta\epsilon$ term to this equation. This additional term is derived by comparing the calculated surface temperature of a slab at a particular location with a measured surface temperature at the same location. The existing deviation is then driven to zero to determine the value of $\epsilon_i$.

Figure 10:
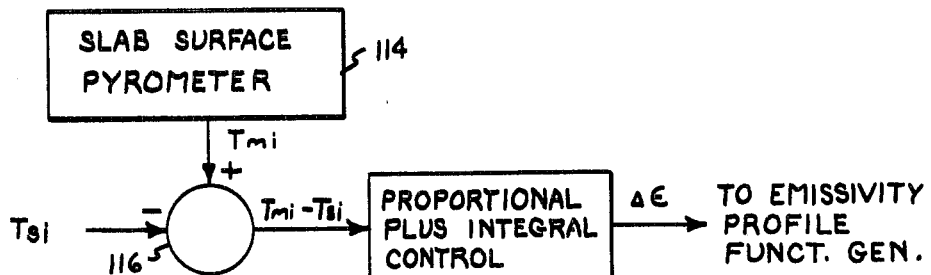
FIG. 10 is a functional diagram of one form of adaptive feedback using pyrometers to modify emissivity values needed for slab temperature calculations.

These steps are carried out in a circuit of the type shown in functional form in FIG. 10. A measurement signal $T_{ml}$ developed by a slab surface pyrometer 114 is applied to one input of an adder circuit 116 having a second input connected to the numerical integrator used to calculate the slab surface temperature at the pyrometer location. The signal $T_{sl}$ applied at this second input is subtracted from the signal $T_{ml}$ to develop a deviation signal $T_{ml} - T_{sl}$. The deviation signal is applied to a proportional plus integral control 118 in which the signal is driven to zero by incrementing the value of the emissivity constant. The necessary increment $\Delta\epsilon$ is used to modify the emissivity function shown in FIG. 4. The effect of the value is to shift the function vertically in a direction dependent upon polarity.

If signals from furnace pyrometers may not be used, it is possible to modify the emissivity factor using a slab pyrometer conventionally located after the first stand in the roughing mill. When the roughing mill pyrometer is used, the heating in the soak zone must be calculated as well as the heating in the preheat and heat zones. The heating in the preheat and heat zones would continue to be regulated by control systems of the type described in connection with FIGS. 1 through 9 but including the emissivity-modifying feedback arrangement described below.

Since the heating in the soak zone is one-sided, the heat distribution through the thickness dimension of a slab in that zone is not parabolic. Equations (1) and (2) used in preheat and heat zone calculations are, for this reason, not applicable. As an approximation, slabs in the soak zone may be mathematically divided into surface, center, and bottom slices. Using the following heat balance equations, the temperatures in these slices are periodically calculated:

(7)
$$\frac{dT_{si}}{dt} = \frac{3\epsilon_i \beta}{C\rho h_i}[(T_{gi}+460)^4 - (T_{si}+460)^4] - \frac{9K(T_{si}-T_{ci})}{C\rho h_i^2}$$

(8)
$$\frac{dT_{ci}}{dt} = \frac{9K}{C\rho h_i^2}(T_{si}-2T_{ci}+T_{bi})$$

(9)
$$\frac{dT_{bi}}{dt} = \frac{9K}{C\rho h_i^2}(T_{ci}-T_{bi})$$

In these equations, $T_{bi}$ represents the temperature in the bottom surface slice of a slab in the $i$ location of the soak zone. All other quantities have been defined already with reference to equations (1) and (2). The gas temperature $T_{gi}$ in the soak zone is measured by a roof-mounted thermocouple and is assumed constant throughout the length of the zone.

Figure 11:
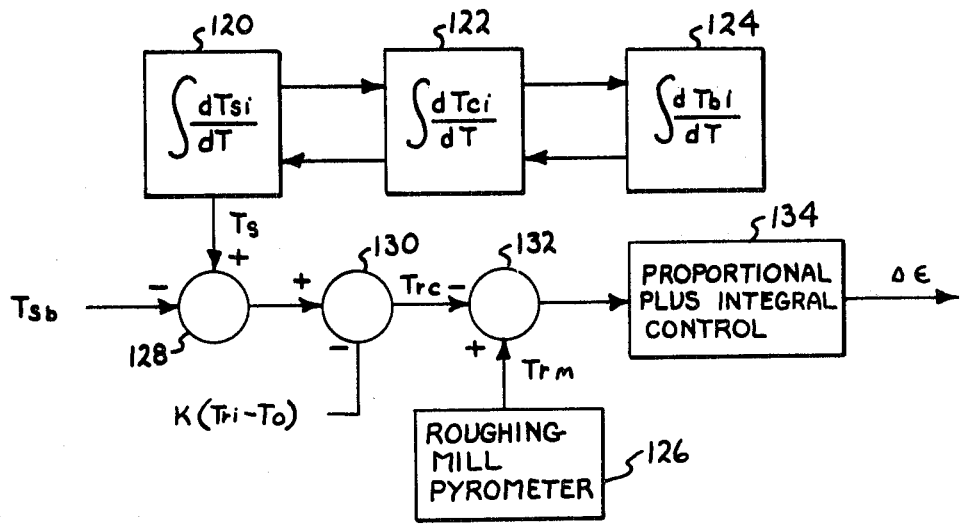
FIG. 11 is a functional diagram of another form of adaptive feedback using a roughing mill pyrometer to modify emissivity values.

Three integrators 120, 122, and 124 shown in FIG. 11 are required to solve equations (7) through (9). When a slab leaves the heat zone and enters the soak zone, the suggested initial conditions for these integrators are:
(10) Initial condition $T_s = T_{cl} + 0.481(T_{sl}-T_{cl})$
(11) Initial condition $T_c = T_{cl} + 0.037(T_{sl}-T_{cl})$
(12) Initial condition $T_b =$ Initial condition $T_s$
where $T_s$, $T_c$, and $T_b$ are temperatures in surface, center, and bottom slices of a slab in the soak zone while $T_{sl}$ and $T_{cl}$ are calculated temperatures in surface and center slices of a slab in the last or $l$th location in the heat zone.

Integrating the heat balance equations (7) through (9) over suitable time intervals yields a calculated surface temperature $T_s$ for a slab at the discharge end of the furnace. Before a comparison can be made between this calculated surface temperature and a measured surface temperature detected by a roughing mill pyrometer 126, the slab surface temperature drop which occurs during travel from the furnace to the pyrometer area must be factored in. A relatively constant temperature drop occurs as the slab passes through scale-breaking rolls (not shown) located near the furnace. This drop is represented by a negative signal $T_{sb}$ applied to an adder circuit 128 which has a second positive input $T_s$ representing the calculated surface temperature.

There is a second variable temperature drop which occurs during travel between the furnace and the pyrometer area. This second temperature drop is expressed as $K(t_{rt}-t_o)$ where $K$ is a predetermined constant temperature drop per unit of time, $t_o$ is the time at which the slab is discharged from the furnace, and $t_{rt}$ is the time at which the slab reaches the pyrometer area. The latter times may be found by tracking the slab from the furnace to the pyrometer by means of a conventional slab-tracking system. A signal representing the second temperature drop $K(t_{rt}-t_o)$ is added to a signal representing $T_s - T_{sb}$ in a second adder circuit 130 to yield a calculated slab surface temperature for a slab at pyrometer 126. The calculated and measured surface temperatures are compared in a third adder circuit 132 which generates a difference signal $T_{rm}-T_{rc}$. This difference signal is driven to zero by incrementing the value of $\epsilon$ in a proportional plus integral control 134. The resulting output $\Delta\epsilon$ of control 134 is applied to the emissivity profile function generator 84 shown in FIG. 7.

While the invention has been explained and described with the aid of particular embodiments thereof, it will be understood that the invention is not limited thereby and that many modifications retaining and utilizing the spirit thereof without departing essentially therefrom will occur to those skilled in the art in applying the invention to specific operating environments and conditions. It is therefore contemplated by the appended claims to cover all such modifications as fall within the scope and spirit of the invention.

What is claimed is:

1. For use with a slab reheat furnace having at least one zone with a controllable heating means, a method of controlling the heating means including the steps of:
   a. predicting the average temperature of each slab in the zone as a function of the gas temperature in the zone and the thermal properties, dimensions, location, velocity and past thermal history of each slab;
   b. establishing a deviation between the predicted average temperature of each slab and a desired average temperature at the location of the slab;
   c. establishing a performance index as a function of the combined deviations of all slabs in the zone; and
   d. adjusting the output of the heating means as a function of the established performance index.

2. A method of the type recited in claim 1 wherein the steps of said method are repeated following each change in the number or location of slabs in the zone or after an interval of predetermined length if no change in number or location has occurred during the interval.

3. A method as recited in claim 2 wherein the step of predicting the average temperature of each slab includes the steps of:
   a. predicting the temperature at surface and center slices in each slab as a function of the temperatures in the zone and the thermal properties, dimensions, location, velocity and past thermal history of the slab; and
   b. combining the predicted surface and center temperatures according to an assumed temperature distribution through the thickness of the slab to establish an average temperature.

4. A method as recited in claim 2 wherein the performance index is established by:
   a. weighting the calculated deviation of each slab as a function of the slab location within the zone whereby the deviation of a slab near the exit from the zone is given greater weight than the deviation of a slab nearer the entrance to the zone; and
   b. adding the weighted deviation of all slabs in the zone to establish the performance index.

5. A method as recited in claim 2 including the further step of revising the value given a thermal property of a slab by:
   a. measuring the surface temperature of the slab in a particular location in the zone;
   b. calculating the surface temperature of the slab in that location;
   c. comparing the measured surface temperature with the calculated surface temperature to establish a temperature deviation; and
   d. adjusting the magnitude of the value given a thermal property for use during future calculations as a function of the established temperature deviation.

6. A method as recited in claim 2 including the further steps of revising the value given a thermal property of a slab by:
   a. measuring the surface temperature of a slab at a particular location in the mill after the slab is discharged from the furnace;
   b. calculating the surface temperature of the slab at the same location in the mill by calculating the surface temperature of the slab at the time of discharge from the furnace and by subtracting calculated temperature losses during the travel of the slab to the particular location;
   c. comparing the measured surface temperature with the calculated surface temperature to establish a temperature deviation; and
   d. adjusting the magnitude of a thermal property for use in future calculations as a function of the established temperature deviation.

7. A method as recited in claim 2 wherein the average temperature of each slab is predicted by:
   a. determining the temperatures in surface and center slices of a slab by integrating the following simultaneous, nonlinear differential equations $$\frac{dT_s}{dt} = \frac{K_1 \epsilon}{h}\left[(T_g+460)^4 - (T_s+460)^4\right] - \frac{K_2(T_s-T_c)}{K_3 h^2}$$

$$\frac{dT_c}{dt} = \frac{K_3(T_s-T_c)}{K_4 h^2}$$

wherein $T_s$ is the predicted temperature in the surface slice, $T_c$ is the predicted temperature in the center slice, $T_g$ is the gas temperature in the zone at the slab location. $K_1$, $K_2$, $K_3$, and $K_4$ are constants dependent upon the properties of the slab, $\epsilon$ is the emissivity of the slab, and $h$ is the thickness of the slab; and
   b. establishing an average temperature using the values of $T_s$ and $T_c$ and assuming a parabolic heat distribution through the thickness of the slab.

8. A method as recited in claim 2 including the further step of limiting the adjustment of the output of said heating means to a predetermined maximum to avoid washing of slab surfaces.

9. A method as recited in claim 3 wherein the temperatures in the zone are established by:
   a. measuring the gas temperatures in the zone in at least two different locations; and
   b. establishing a zone temperature profile conforming to a predetermined pattern and having magnitudes proportional to the measured ambient temperatures.

10. A method as recited in claim 3 wherein the performance index is established by:
   a. weighting the calculated deviation of each slab as a function of the location of the slab within the zone whereby the deviation of a slab near the exit from the zone is given greater weight than the deviation of a slab nearer the entrance to the zone; and
   b. adding the weighted deviations of all slabs in the zone to establish the performance index.

11. A method as recited in claim 14 including the further step of limiting the adjustment of the output of said heating means to a predetermined maximum to avoid washing of slab surfaces.

12. A method as recited in claim 9 wherein the performance index is established by:
 a. weighting the calculated deviation of each slab as a function of the location of the slab within the zone whereby the deviation of a slab near the exit from the zone is given greater weight than the deviation of a slab nearer the entrance to the zone; and
 b. adding the weighted deviations of all slabs in the zone to establish the performance index.

13. A control system for use with a slab reheat furnace having at least one zone with controllable heating means, said system including:
 a. means for predicting the temperatures in surface and center slices of each slab in the zone as a function of the temperatures in the zone and the thermal properties, dimensions, location, and past thermal history of each slab;
 b. means for establishing an average temperature in the slab;
 c. means for subtracting the established average temperature of each slab from a predetermined desired temperature of a slab in the same location to establish a temperature deviation for each slab;
 d. means for combining the established temperature deviations to establish a performance index for the zone; and
 e. means for adjusting the output of the heating means as a function of the established performance index.

14. A control system as recited in claim 13 further including means for initiating operation of said system following each change in number or location of slabs within the zone or after an interval of predetermined length if no change in number or location has occurred during the interval.

15. A control system as recited in claim 13 further including:
 a. means for measuring the gas temperatures in at least two spaced locations in the zone;
 b. function-generating means for generating a zone temperature profile as a function of the measured ambient temperatures.

16. A control system as recited in claim 13 wherein said combining means further includes:
 a. means for weighting the established temperature of each slab in accordance with the location of the slab in the zone; and
 b. means for summing the weighted deviations of all slabs in the zone.

17. A control system as recited in claim 13 further including:
 a. means for measuring the surface temperature of a slab at a predetermined location in the zone;
 b. means for establishing the deviation between the measured surface temperature of the slab and the calculated surface temperature of the slab; and
 c. means for altering the values assigned a thermal property of all slabs as a function of the established temperature deviation.

18. A control system as recited in claim 13 further including:
 a. means for calculating the surface temperature of a slab at a time of discharge from the furnace;
 b. means for measuring the surface temperature of the slab at a predetermined location in the mill after the slab has been discharged from the furnace;
 c. means for calculating the temperature losses of the slab during the time required for the slab to travel from the furnace to the predetermined location of the measured means;
 d. means for comparing the measured surface temperature with the calculated discharge surface temperature minus the calculated temperature losses to establish a temperature deviation; and
 e. means for altering the values assigned a thermal property of all slabs as a function of the established temperature deviation.

19. A control system as recited in claim 13 further including means for limiting the adjustment performed by said adjusting means to predetermined maximum to avoid washing of slab surfaces.

20. A control system as recited in claim 14 wherein said combining means further includes:
 a. means for weighting the established temperature deviation of each slab in accordance with the location of the slab within the zone; and
 b. means for summing the weighted deviations of all slabs in the zone.

21. A control system as recited in claim 14 further including means for limiting the adjustment performed by said adjusting means to predetermined maximum to avoid washing of slab surfaces.

22. A control system as recited in claim 14 further including:
 a. means for measuring the surface temperature of a slab at a predetermined location in the zone;
 b. means for establishing the deviation between the measured surface temperature of a slab and the calculated surface temperature of the slab; and
 c. means for altering the values assigned a thermal property of all slabs as a function of the established temperature deviation.

23. A control system as recited in claim 14 further including:
 a. means for calculating the surface temperature of a slab at its time of discharge from the furnace;
 b. means for measuring the surface temperature of a slab at a predetermined location in the mill after the slab has been discharged from the furnace;
 c. means for calculating the temperature losses of the slab during the time required for the slab to travel from the furnace to the predetermined location of the measuring means;
 d. means for comparing the measured surface temperature with the calculated discharge surface temperature minus the calculated temperature losses to establish a temperature deviation; and
 e. means for altering the values assigned a thermal property of all slabs as a function of the established temperature deviation.

UNITED STATES PATENT OFFICE
CERTIFICATE OF CORRECTION

Patent No. 3,604,695  Dated September 14, 1971

Inventor(s) DONALD E. STEEPER

It is certified that error appears in the above-identified patent and that said Letters Patent are hereby corrected as shown below:

Column 3, line 8   Delete "58"

Column 4, line 51   Equation 5 should read -- $T_{ai} = (1/3)(T_{si} + 2\ T_{ci})$ --

Column 5, line 48   That portion of the equation reading $$\text{``} \int \left\{ \frac{2e_i \beta}{\rho h_i \delta} \right. \text{''}$$

should read -- $\int \left\{ \frac{2e_i \delta}{\rho h_i \delta} \right.$ --

Column 8, line 50   That portion of the equation reading $\text{``} \frac{3e_i \beta}{C\rho h_i} \text{''}$ should read -- $\frac{3e\delta}{C\rho h_i}$ --

Column 11, line 1   "14" should read -- 4 --

Signed and sealed this 2nd day of May 1972.

(SEAL)
Attest:

EDWARD M. FLETCHER, JR.          ROBERT GOTTSCHALK
Attesting Officer                Commissioner of Patents